United States Patent [19]

Ishii

[11] 4,298,264
[45] Nov. 3, 1981

[54] SINGLE-PIVOT TYPE FOCAL-PLANE SHUTTER DRUM MECHANISM

[75] Inventor: Haruo Ishii, Wako, Japan

[73] Assignee: Asahi Kogaku Kogyo Kabushiki Kaisha, Tokyo, Japan

[21] Appl. No.: 146,917

[22] Filed: May 2, 1980

[30] Foreign Application Priority Data

May 25, 1979 [JP] Japan .................................. 54-64653

[51] Int. Cl.³ .............................................. G03B 9/32
[52] U.S. Cl. ..................................... 354/242; 354/244
[58] Field of Search ........................ 354/242, 243, 244

[56] References Cited

U.S. PATENT DOCUMENTS

| | | | |
|---|---|---|---|
| 3,657,982 | 4/1972 | Uno et al. | 354/242 |
| 3,687,044 | 8/1972 | Watanabe | 354/242 |
| 3,688,674 | 9/1972 | Kuramoto et al. | 354/242 |
| 3,688,675 | 9/1972 | Yamashita et al. | 354/242 |
| 3,713,373 | 1/1973 | Sato | 354/242 |
| 4,053,913 | 10/1977 | Sato | 354/244 |
| 4,153,360 | 5/1979 | Kodaira et al. | 354/243 |
| 4,215,925 | 8/1980 | Date et al. | 354/244 |

FOREIGN PATENT DOCUMENTS 2308118 11/1976 France ................................ 354/244

Primary Examiner—Russell E. Adams
Attorney, Agent, or Firm—Sughrue, Mion, Zinn, MacPeak & Seas

[57] ABSTRACT

A single-pivot type focal-plane shutter mechanism having a reduced size and correspondingly increased angle of rotation of the top and bottom curtain drums. The top and bottom curtain drums are provided with protrusions extending in opposite directions. An engaging ring is disposed between the top and bottom curtain drums rotatably mounted on the same shaft. The engaging ring has protrusions extending from opposite sides thereof which engage, upon rotation of the drums, with the protrusions on the top and bottom curtain drums. With this structure, the top and bottom curtain drums can rotate through angles of approximately 600°.

5 Claims, 5 Drawing Figures

SINGLE-PIVOT TYPE FOCAL-PLANE SHUTTER DRUM MECHANISM

BACKGROUND OF THE INVENTION

The invention relates to a shutter mechanism. More particularly, the invention relates to a drum structure in a single-pivot type focal-plane shutter mechanism.

In a conventional single-pivot type focal-plane rotary drum in a camera shutter mechanism, the bottom curtain drum is locked by a pin which is coupled to the bottom curtain drum and is shaped so as to extend into the top curtain drum. It is necessary to form a circumferential groove in the top curtain drum so that the top curtain drum may be turned with the bottom curtain drum locked. It is necessary to limit the angular extent of the circumferential groove to a range of from 200° to 300° in order to maintain the strength of the top curtain drum. Furthermore, it is necessary to set the length of run of each of the top and bottom curtains to values larger than the length of the picture plane opening in order to maintain satisfactory curtain running characteristics. Because of these requirements, the diameter of each of the top and bottom curtain drums must be above a predetermined value.

FIG. 1 shows a conventional rotary drum of a single-pivot type focal-plane shutter. In FIG. 1, reference numeral 1 designates a top curtain drum, 1b a circumferential groove formed in the top curtain drum 1, 2 a top curtain gear, and 3 a top curtain drum shaft. These elements rotate as one unit. Further in FIG. 1, reference character 2a designates a top curtain drum locking pin coupled to the top curtain gear 2, 4 a top curtain drum locking level, 6 a bottom curtain drum, 6a a pin which is coupled to the drum 6 and has a length such that it passes through the circumferential groove and is parallel to the top curtain drum shaft, 6b a bottom curtain drum locking plate having a fork 6d with which the pin 6a engages, 7 a bottom curtain locking lever, 8 a top curtain ribbon, and 11 a bottom curtain.

FIG. 1 shows a state of the rotary drum in which only the top curtain has been run. In order to allow the top curtain to run with the bottom curtain locked or in order that, after the top curtain has been run, the bottom curtain locking lever 7 can be released to rotate the bottom curtain locking plate 6b, pin 6a and bottom curtain drum 6 as a single unit to thereby allow the bottom curtain to run, it is necessary to provide the circumferential groove 1b in the top curtain drum 1. In order to maintain the strength of the top curtain drum 1, the angle of the circumferential groove 1b must be limited to a range of from 200° to 300°. Furthermore, the length of run of each of the top and bottom curtains must have a certain minimum value larger than the length of the picture plane opening in order to satisfactorily maintain the desired curtain running characteristics. From the above-described requirements, the diameters of the top curtain drum 1 and bottom curtain drum 6 are determined.

The recent tendency in cameras is to miniaturize. Accordingly, it is strongly demanded that the interval components of the camera be miniaturized. Moreover, it is also required that yet more mechanisms be accommodated in the space which is provided by reducing the size of the components.

Accordingly, an object of the invention is to provide a rotary drum for a single-pivot type focal-plane shutter which is simple in construction but with which the diameters of the top and bottom curtain drums can be reduced thereby contributing to the miniaturization of cameras and improvements in the functions thereof.

SUMMARY OF THE INVENTION

This, as well as other objects of the invention, are met by a single-pivot type focal-plane shutter mechanism including a top drum having a first protrusion extending therefrom and a bottom curtain drum rotatable around a common shaft with the top curtain drum having a second protrusion extending therefrom. An engaging ring is positioned between the top and bottom curtain drums having third and fourth protrusions which are engagable through rotation with the first and second protrusions on the top and bottom curtain drums. The engaging ring is rotatably mounted on the common shaft. A bottom curtain locking lever and pawl are provided for locking the bottom curtain drum while a top curtain gear, locking gear, locking pin and top curtain locking lever are provided for locking the position of the top curtain drum.

DESCRIPTION OF THE PREFERRED EMBODIMENTS

Figure 1:
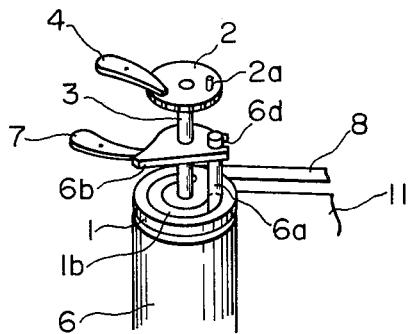
FIG. 1 is a perspective view of a conventional single-pivot type focal-plane rotary drum of a shutter mechanism.
Figure 2:
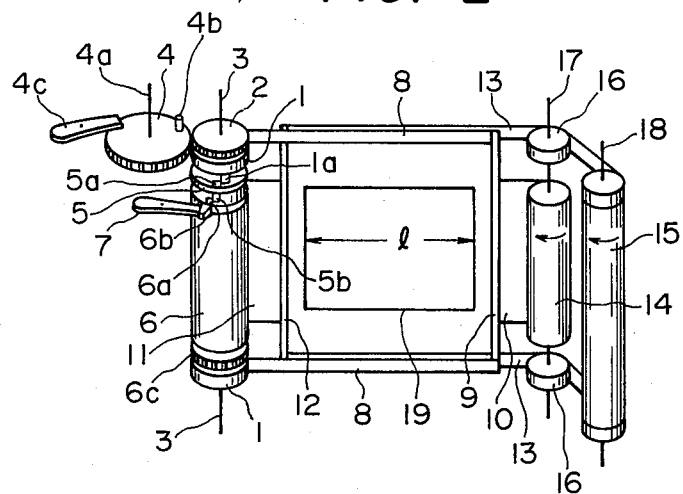
FIG. 2 is a perspective view of a shutter mechanism of the invention.

The construction of a rotary drum of a single-pivot type focal-plane shutter according to the invention will now be described. FIG. 2 shows the construction of a shutter according to the present invention in which the diameter of the rotary drum is reduced by increasing the angle of rotation of the rotary drum.

In FIG. 2, reference numeral 1 designates a top curtain drum, 1a a protrusion extending downwardly from the drum 1, 2 a top curtain gear with the elements 1, 1a and 2 being commonly rotated by a shaft 3, 4 a locking gear engaged with the gear 2 with the locking gear 4 having a shaft 4a, a locking pin 4b rigidly coupled to the gear 4, and a top curtain locking lever 4c adapted to lock the top curtain drum 1 by locking the pin 4b, 5 an engaging ring which is rotatable around the shaft 3 and has protrusions 5a on the top and bottom surfaces thereof, and 6 a bottom curtain drum having a protrusion 6a and a locking pawl 6b on the top and a bottom curtain drum gear 6c on the lower portion with the bottom curtain drum 6 rotatable freely around the shaft 3. The upper protrusion 5a of the engaging ring 5 confronts the protrusion 1a while the lower protrusion 5b of the engaging ring 5 is controlled by the protrusion 6a on the top of the bottom curtain drum. The gear 6c can be used to transmit the motion of the bottom curtain drum 6 as a signal for lowering the mirror if the invention is applied to a single-lens reflex camera.

Further in FIG. 2, reference numeral 7 designates a bottom curtain locking lever adapted to lock the bottom curtain with the locking pawl 6b, 8 top curtain ribbons, 9 a metal edge of a top curtain 10, 11 a bottom curtain, 12 a metal edge of the bottom curtain 11, 13 bottom curtain ribbons, 14 a top curtain winding drum energized to rotate in the direction of the arrow, 15 a bottom curtain winding drum energized to rotate in the direction of the arrow, 17 and 18 the shafts of the drums 14 and 15 respectively, 16 bottom curtain ribbon rollers which are freely rotatable, and 19 a picture plane opening having a length of l. FIG. 2 shows a state of the shutter in which the top curtain drum 1 has been released and run.

Figure 3:
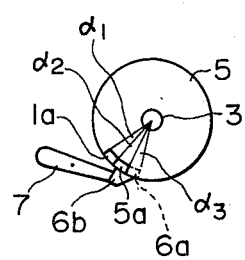
FIGS. 3, 4 and 5 are explanatory diagrams for a description of the angles of rotation of a top curtain drum and a bottom curtain drum.
Figure 4:
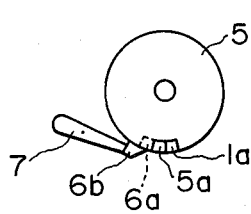
Figure 5:
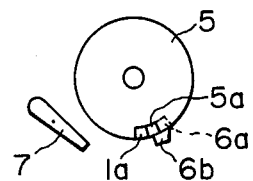

FIGS. 3, 4 and 5 show the positional relationships of the top curtain drum protrusion 1a, the bottom curtain drum protrusion 6a, and the engaging ring protrusion 5a respectively, when the top and bottom curtains have been wound, when only the top curtain drum has been released, and when both of the top and bottom curtain drums have been released. In FIG. 3, the angles of the protrusions 1a, 5a and 6a with respect to the rotary shaft 3 are represented by $\alpha_1$, $\alpha_2$ and $\alpha_3$, respectively.

When, in the shutter thus constructed, the top curtain drum 1 turns counterclockwise by action of the gears 4 and 2, the protrusion 1a pushes against the upper protrusion 5a of the engaging ring 5 as a result of which the engaging ring 5 also turns counterclockwise. During this time, the protrusion 6a is pushed by the lower protrusion 5a of the engaging ring 5. On the other hand, the pin 4b is locked by the lever 4c and the locking pawl 6b is locked by the locking lever 7. Thus, both of the top curtain drum 1 and the bottom curtain drum 6 are set ready for winding the curtains as shown in FIG. 3.

When the locking lever 4c is thereafter released, the top curtain drum 1 together with the protrusion 1a turns clockwise. When the top curtain drum 1 has turned through an angle of $[360° - (\alpha_1 + \alpha_2)]$, the protrusion 1a will begin to push the protrusion 5a thereby turning the engaging ring 5. When the top curtain drum 1 is further turned through an angle of $[360° - (\alpha_2 + \alpha_3)]$, at which point the protrusion 5a strikes against the protrusion 6a, it is stopped in the position shown in FIG. 4. It should be noted that although the top curtain drum 1 has thus been stopped, in practice the top curtain drum 1 may be provided with an additional stopper.

As is clear from the above description, the top curtain drum 1 turns through an angle of $[720° - (\alpha_1 + 2\alpha_2 + \alpha_3)]$. After the top curtain drum 1 has turned through this angle, the locking lever 7 is released and the bottom curtain drum 6 together with its protrusion 6a turns clockwise. When the bottom curtain drum 6 has turned through an angle of $[360° - (\alpha_2 + \alpha_3)]$, the protrusion 6a comes into engagement with and pushes the against protrusion 5b thereby turning the engaging ring 5. When the bottom curtain drum 6 is further turned through an angle of $[360° - (\alpha_1 + \alpha_2)]$, the protrusion 5a strikes against the protrusion 1a and the bottom curtain drum 6 is stopped. In this case also, the bottom curtain drum 6 is turned through an angle of $[720° - (\alpha_1 + 2\alpha_2 + \alpha_3)]$.

Thus, both of the top and bottom curtain drums are turned through angles of about 600°. That is, the angle of rotation of each drum is at least twice that of a conventional single-pivot drum. Therefore, if the length of run of the shutter curtain is set to the same value as in a conventional drum, then the diameter of the drum can be halved.

As is apparent from the above description, with the use of the invention, the size of the single-pivot type shutter drum is reduced as a result of which the overall size of the camera can be reduced. Furthermore, complex functions can be implemented in the camera by arranging, for instance, magnets for releasing the locking levers 4c and 7 in the space which was provided by reducing the size of the drum.

What is claimed is:

1. A single-pivot type focal-plane shutter mechanism comprising: a top curtain drum having a first protrusion extending therefrom; a bottom curtain drum having a second protrusion extending therefrom, said top and bottom curtain drums being rotatable around a common shaft; and an engaging ring having third and fourth protrusions which are engagable through rotation with said first and second protrusions on said top and bottom curtain drums, said engaging ring being rotatably mounted on said common shaft.

2. A single-pivot type focal-plane shutter mechanism comprising: a top curtain drum having a first protrusion extending downwardly therefrom; a bottom curtain drum having a second protrusion extending upwardly therefrom, said top and bottom curtain drums being rotatable around a common shaft; and an engaging ring having third and fourth protrusions extending from opposite sides thereof, said third protrusion being engagable with said first protrusion and said fourth protrusion being engagable with said second protrusion, said engaging ring being rotatably mounted on said common shaft.

3. The shutter mechanism of claim 2 wherein said third and fourth protrusions are disposed opposite one another on opposite sides of said engaging ring.

4. The shutter mechanism of any of claims 1-3 further comprising a bottom curtain locking lever and a bottom curtain locking pawl for locking said bottom curtain drum at a predetermined rotational position thereof.

5. The shutter mechanism of any of claims 1-3 further comprising a top curtain gear rotatably mounted around said common shaft and being rigidly coupled to rotate with said top curtain drum; a locking gear engaged with said gear rotating with said top curtain drum; a locking pin rigidly coupled to said locking gear; and a top curtain locking lever engagable with said locking pin to lock said top curtain drum at a predetermined rotational position thereof.

* * * * *